United States Patent [19]

Leonaggeo et al.

[11] Patent Number: 5,646,605
[45] Date of Patent: Jul. 8, 1997

[54] METHOD AND APPARATUS FOR REMOTE CONTROL OF LOCKS

[75] Inventors: Patricia Leonaggeo, Boynton Beach; James A. Lamb, Coral Springs, both of Fla.

[73] Assignee: Motorola, Inc., Schaumburg, Ill.

[21] Appl. No.: 573,762

[22] Filed: Dec. 18, 1995

Related U.S. Application Data

[63] Continuation of Ser. No. 270,569, Jul. 5, 1994, abandoned.
[51] Int. Cl.⁶ .................................. H04Q 1/00
[52] U.S. Cl. .............. 340/825.31; 379/102.06; 340/825.44
[58] Field of Search ............... 340/825.31, 825.34, 340/825.44, 825.69, 825.72; 70/278; 379/103

[56] References Cited

U.S. PATENT DOCUMENTS

| | | | |
|---|---|---|---|
| 3,831,065 | 8/1974 | Martin | 340/825.31 |
| 4,208,630 | 6/1980 | Martinez | 340/825.44 |
| 4,538,031 | 8/1985 | Bennig | 379/103 |
| 4,672,375 | 6/1987 | Mochida | 340/825.31 |
| 4,686,529 | 8/1987 | Kleefeldt | 340/825.69 |
| 4,779,090 | 10/1988 | Micznik | 340/825.31 |
| 4,808,995 | 2/1989 | Clark | 340/825.31 |
| 4,931,789 | 6/1990 | Pinnow | 340/825.31 |
| 4,962,522 | 10/1990 | Marian | 340/825.44 |
| 4,988,992 | 1/1991 | Heitschel | 340/825.31 |
| 5,254,908 | 10/1993 | Alt | 340/825.44 |

OTHER PUBLICATIONS

Motorola Technical Developments, p. 36 Gail Marino Mar. 1990.

*Primary Examiner*—Brian Zimmerman
*Attorney, Agent, or Firm*—James A. Lamb

[57] ABSTRACT

A remote controlled lock system (100) includes a computer (111), a system controller (102), a transmitter (109), and at least one remote controlled lock device (105). The system controller (102) generates one of a digital lock or unlock code upon a change of a user access condition of the computer (111). The transmitter (109) transmits a radio signal including the lock code or the unlock code, and a selective call receiver address. The remote controlled lock device (105) includes a selective call receiver (310) and an electromechanical lock (311). The electromechanical lock (311) has a locking member (1205) which is switched to a mechanically stable lock or unlock position in response to the lock or unlock code when the radio signal when the transmitted selective call receiver address matches a predetermined address stored in the selective call receiver (310).

10 Claims, 14 Drawing Sheets

View A-A'

View A-A'

FIG. 12  View B-B'

View B-B'

View B-B'

1

METHOD AND APPARATUS FOR REMOTE CONTROL OF LOCKS

This is a continuation of application Ser. No. 08/270,569, filed Jul. 5, 1994 and now abandoned.

FIELD OF THE INVENTION

This invention relates in general to remote controlled locks and in particular to electromechanical locks remotely controlled by computer commands.

BACKGROUND OF THE INVENTION

Known means of locking secure areas, such as offices and desks, include mechanical locks, such as keyed locks, and electromechanical door locks, such as those used at entry doors controlled by a receptionist or security person, often in conjunction with remote visual monitoring facilities. Such electromechanical locks are often controlled to allow remote unlocking only, with locking accomplished solely by mechanical means, such as automatic mechanical door closers used in conjunction with a door lock that mechanically locks upon the closing of the door.

In office work areas, there is an apparently increasing requirement for locking to provide security against theft of intellectual and other valuable property which is stored in file cabinets, desks, credenzas, and the like. Such locking typically requires the use of key or a combination locks, which is inconvenient, particularly when a worker has several door and drawer locks which require independent operations to unlock and lock. Furthermore, an inconvenience arises when the worker forgets to lock every lock, and has to return to the office to do so, or ask a third party to do so.

Thus, what is needed is a convenient means of unlocking and locking one or more locks, including office furniture locks, simultaneously and remotely.

SUMMARY OF THE INVENTION

Accordingly, in a first aspect of the present invention, a remote controlled lock system includes a computer, a paging system controller, a transmitter, and at least one remote lock device. The computer includes a security utility and a command generator. The security utility is for generating a change of a user access condition of the computer in response to one of a user password input and an event, and is also for generating a corresponding output signal which indicates the change of the user access condition, wherein the user access condition either allows or prevents user access to at least one program or file in the computer. The command generator is coupled to the security utility and is for generating at least one digital lock command in response to the output signal. The at least one digital lock command includes one of a lock instruction and a unlock instruction. The paging system controller is coupled to the computer and is for receiving the at least one lock command and generating at least one selective call receiver address corresponding to the at least one selective call receiver identity. The paging system controller is also for generating one of a digital lock code and a digital unlock code. The transmitter is for transmitting a radio frequency signal including the at least one selective call receiver address and the one of the digital lock code and digital unlock code.

The at least one remote controlled lock device includes a selective call receiver and an electromechanical lock. The selective call receiver is for receiving the radio frequency signal and for generating one of a lock signal and an unlock signal when the selective call receiver address matches a predetermined address stored in the selective call receiver and the one of the digital lock code and digital unlock code matches a predetermined respective lock code and unlock code stored in the selective call receiver. The electromechanical lock has a locking member. The locking member is switched to one of a mechanically stable lock position and a mechanically stable unlock position, respectively, in response to the one of the lock signal and unlock signal.

In a second aspect of the present invention, a remote controlled lock system for automatically controlling remote locks includes a computer, a system controller, a transmitter, and at least one remote controlled lock device. The computer includes a security utility and a command generator. The security utility is for generating a change of a user access condition of the computer in response to one of a user password input and an event, and is also for generating a corresponding output signal which indicates the change of the user access condition. The user access condition either allows or prevents user access to at least one program or file in the computer. The command generator is coupled to the security utility and is for generating at least one lock command in response to the output signal. The at least one lock command includes one of a lock instruction and a unlock instruction. The system controller is coupled to the computer for receiving the at least one lock command, and is for generating one of a lock code and an unlock code corresponding to the one of the lock instruction and the unlock instruction in the at least one lock command. The transmitter is for transmitting a signal including the one of the lock code and the unlock code.

The at least one remote controlled lock device includes a receiver and an electromechanical lock. The receiver is for receiving the signal and for generating one of a lock signal and an unlock signal when the one of the lock code and the unlock code matches one of two corresponding codes stored in the receiver. The electromechanical lock has a locking member. The locking member is switched to a mechanically stable position, which is one of a lock position and an unlock position, in response to the one of the lock signal and the unlock signal.

In a third aspect of the present invention, a method for automatically controlling locks in a remote controlled lock system includes steps of changing a user access condition, generating at least one lock command automatically, transmitting a signal, receiving the signal, and activating an electromechanical lock. In the step of changing the user access condition, the security mode of a computer is changed in response to a user password input or an event, and a corresponding output signal is generated which indicates the change of the user access condition. The user access condition either allows or prevents user access to at least one program or file in the computer. In the step of generating at least one lock command automatically, at least one command is generated, including one of a lock instruction and an unlock instruction, in response to the output signal. In the step of transmitting, a signal including one of a lock code and an unlock code corresponding to the one of the lock instruction and the unlock instruction is transmitted to the remote lock device. In the step of activating an electromechanical lock, an electromechanical lock is activated at the remote lock device to set a locking member at one of a lock position and an unlock position corresponding to the one of the lock instruction and unlock instruction included in the signal.

DETAILED DESCRIPTION OF THE INVENTION

Figure 1:
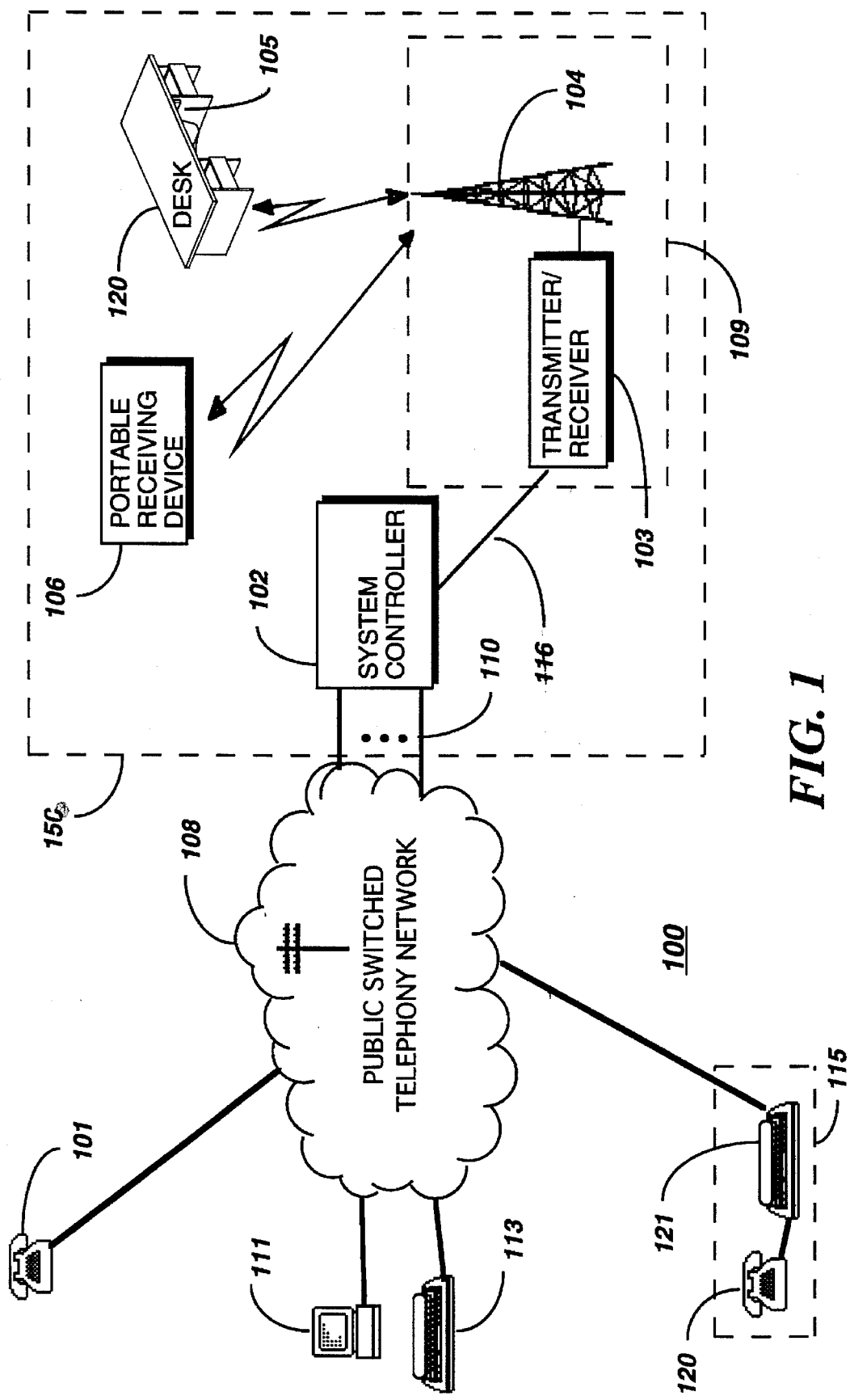
FIG. 1 is an electrical block diagram of a remote controlled lock system, in accordance with the preferred embodiment of the present invention.

Referring to FIG. 1, an electrical block diagram of a remote controlled lock system 100 is shown, in accordance with a preferred embodiment of the present invention. The remote controlled lock system 100 comprises input terminal devices, such as a telephone 101, a computer 111, a desktop input unit 113 (such as a desktop page entry terminal), and a telephone/desktop input unit combination input terminal 115 comprising a telephone handset 120 and a desktop input unit 121, coupled by a conventional public switched telephone network (PSTN) 108 to a system controller 102 through a plurality of telephone links 110. The telephone links 110 may be a plurality of twisted wire pairs, or a multiplexed trunk line. The system controller 102 is coupled to and oversees the operation of radio frequency transmitter/receivers 103 (only one of which is shown), through one or more communication links 116, which typically are twisted pair telephone wires, and additionally can include RF, microwave, or other high quality audio communication links. Transmitter/receivers 103, which are message store and forward stations, encode and decode inbound and outbound telephone addresses into formats that are compatible with land line message switch computers and personal radio telephone addressing requirements, such as cellular message protocols. The system controller 102 can also function to encode and decode paging messages which are transmitted or received by the radio frequency transmitter/receiver 103. Telephony signals are typically transmitted to and received from the system controller 102 by telephone sets such as the telephone 101, or the telephone handset 120 of the input terminal 115. The desktop input unit 121 can interrupt the transmission path between the telephone 120 and the desktop input unit 121 of the input terminal 115 when data messages are being transmitted between the desktop input unit 121 and the PSTN 108. Telephony signals and data messages are transmitted from and received by at least one antenna 104 coupled to each of the radio frequency transmitter/receivers 103. The radio frequency transmitter/receivers 103 are used to transmit data or voice paging messages coupled from the system controller 102 to a portable receiving device 106, which has a keyboard and display, or a remote lock device 105, which is installed in a desk 120. Data messages, and acknowledgments to data messages, may also be received by the transmitter/receivers 103 from the portable receiving device 106 and the remote desk lock 105, and are coupled to the system controller 102. A transmitter station 109 comprises the transmitter/receiver 103 and the antenna 104 associated therewith. A selective call radio communication system 150 comprises the transmitter station 109, the links 116, the system controller 102, the portable receiving device 106, and the remote lock device 105.

It will be appreciated that other selective call radio terminal devices (not shown in FIG. 1), such as portable cellular telephones, mobile cellular telephones, mobile radio data terminals, mobile cellular telephones having attached data terminals, or mobile radios (conventional and trunked) having data terminals attached, are also able to be used in the selective call radio communication system 150. In the following description, the term "selective call device" will be used to refer to the remote lock device 105, or the portable receiving device 106, a mobile cellular telephone, a mobile radio data terminal, a mobile cellular telephone having an attached data terminal, or a mobile radio (conventional or trunked) having a data terminal attached. Each of the selective call devices assigned for use in the remote controlled lock system 100 preferably has an address assigned thereto which is unique within the selective call radio communication system 150. The address enables the transmission of a message from the system controller 102 only to the addressed selective call device, and identifies messages and responses received at the system controller 102 from the selective call device. Furthermore, each of one or more of the selective call devices preferably also has a unique telephone number assigned thereto, the telephone number being unique within the PSTN 108. A list of the assigned addresses and correlated telephone numbers for the selective call devices is stored in the system controller 102 in the form of a subscriber data base.

It will be further appreciated that additional remote lock devices 105 can be installed in other desks and other lockable items, such as file cabinets, credenzas, cabinets, office machines, and doors.

It will be noted that the system controller 102 is capable of operating in a distributed transmission control environment that allows mixing cellular, simulcast, master/slave, or other coverage schemes involving a plurality of radio frequency transmitter/receivers 103, and antennas 104 for providing reliable radio signals within a geographic area as large as a nationwide or worldwide network. Moreover, as one of ordinary skill in the art would recognize, the telephonic and selective call radio communication functions may reside in separate system controllers 102 which operate either independently or in a networked fashion.

Figure 2:
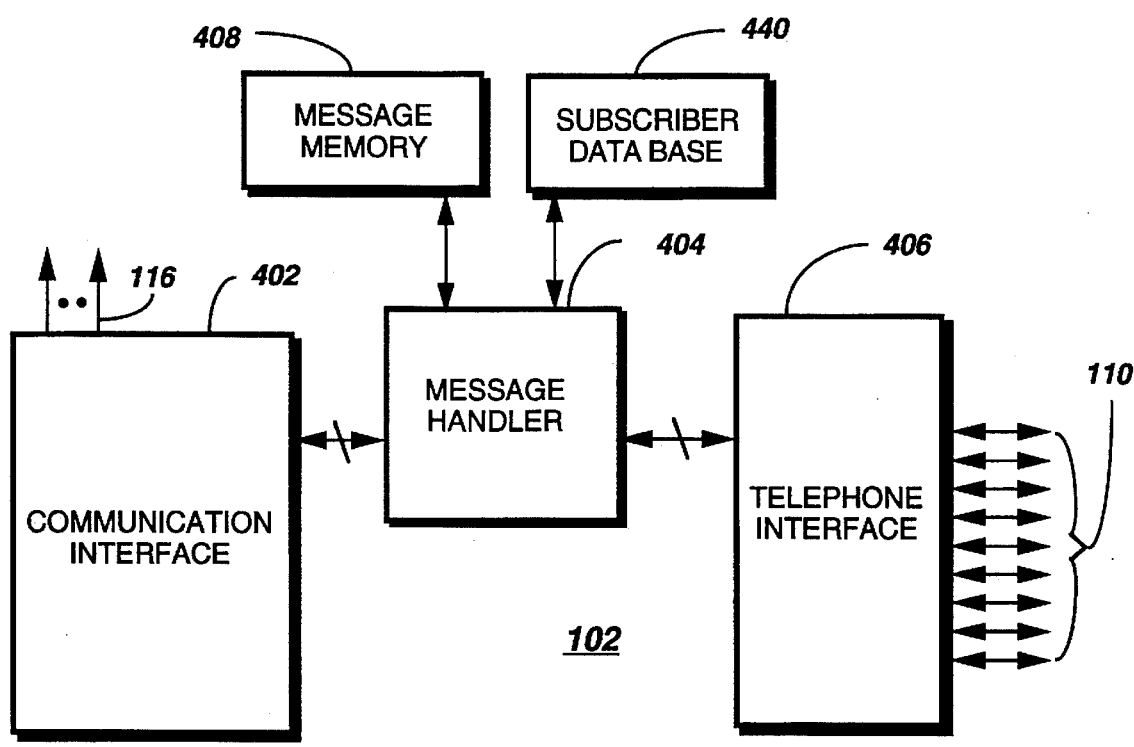
FIG. 2 is an electrical block diagram of a system controller used in the remote controlled lock system, in accordance with the preferred embodiment of the present invention.

Referring to FIG. 2, an electrical block diagram of the system controller 102 is shown, in accordance with the preferred embodiment of the present invention. The system controller 102 comprises a communication interface 402, a message handler 404, a message memory 408, a subscriber data base 440, and a telephone interface 406. The communication interface 402 queues data and stored voice messages for transmission to the selective call devices, connects telephone calls for transmission to the selective call devices, and receives acknowledgments, data responses, data messages, and telephone calls from the selective call devices. The communication interface 402 is coupled to the radio frequency transmitter/receiver 103 (FIG. 1) by the communication links 116. The message handler 404, which routes and processes messages, is coupled to the communication interface 402 and is further coupled to the telephone interface 406, the subscriber data base 440, and the message memory 408. The telephone interface 406 handles the public switched telephone network 108 (PSTN) (FIG. 1) physical connection, connecting and disconnecting telephone calls at the telephone links 110, and routing the audio signals between the telephone links and the message handler 404. The subscriber data base 440 stores information for each selective call device used by subscribers of the selective call radio communication system 150, including a correlation between the unique address assigned to each selective call device and the telephone number used within the PSTN 108 to route messages and telephone calls to each selective call device, and other subscriber determined preferences, such as hours during which messages are to be held back from delivery to the selective call device. The subscriber data base 440 also stores a correlation between a lock instruction and a lock code and a correlation between an unlock instruction and an unlock code for the remote lock devices 105. The message memory 408 stores messages and responses in queue for scheduled delivery to messaging terminals and selective call devices.

The system controller 102 is preferably similar a model E09PED0552 PageBridge® paging terminal manufactured by Motorola, Inc., of Schaumburg Ill. The communication interface 402, the message handler 404, the message memory 408, the subscriber data base 440, and the telephone interface 406 are preferably implemented within portions of the model E09PED0552 PageBridge® paging terminal which include, but are not limited to those portions providing program memory, a central processing unit, input/output peripherals, and a random access memory. The communication interface 402 is a conventional set of functions, while the message handler 404 is uniquely modified to include all the functions described herein. The system controller 102 alternatively could be implemented using a MPS2000® paging terminal manufactured by Motorola, Incorporated of Schaumburg, Ill. The subscriber data base 440 and message memory 408 may alternatively be implemented as magnetic or optical disk memory, which may alternatively be external to the system controller 102.

Figure 3:
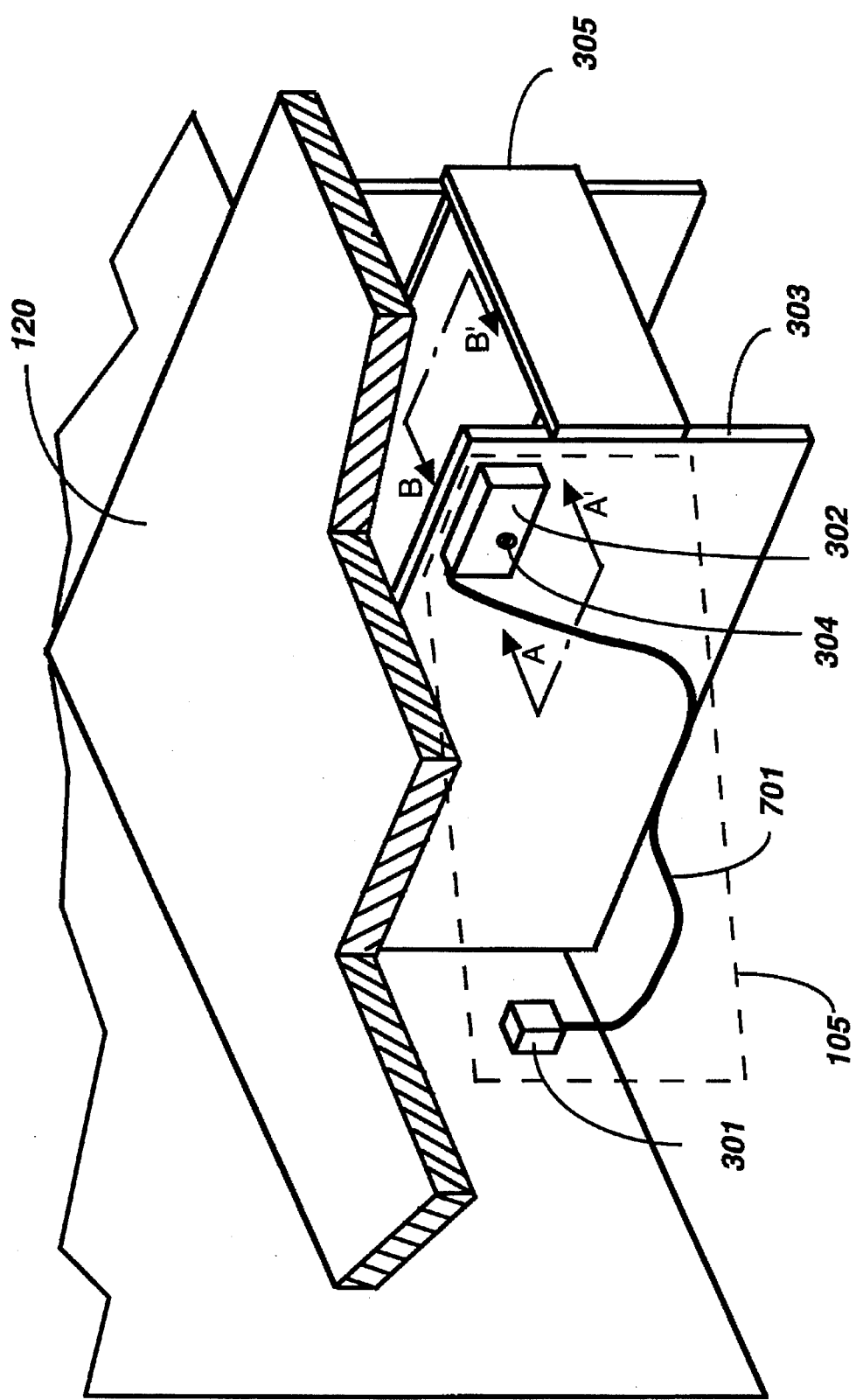
FIG. 3 is a cut away mechanical view of a desk in which a remote lock device is used in the remote controlled lock system, in accordance with the preferred embodiment of the present invention.

Referring to FIG. 3, a cut away mechanical view of the desk 120 is shown in which the remote lock device 105 is used, in accordance with a preferred embodiment of the present invention. The remote lock device 105 comprises an AC/DC low voltage wall outlet power converter 301 coupled by a power cord 701 to a lock box 302. Alternatively, no AC/DC low voltage wall outlet power converter 301 is used and the remote lock device 105 relies upon battery power. The remote lock device 105 is mounted to a desk partition 303. A keyslot of a keyed mechanical lock 304 is accessible in the cover of the lock box 302. A drawer 305 is locked and unlocked by the remote lock device 105, which has a locking member 1205 (FIG. 12) protruding through a hole 1215 (FIG. 12) of the partition 303. Views, A-A' and B-B' show directions at which items in several figures described below are illustrated.

Figure 4:
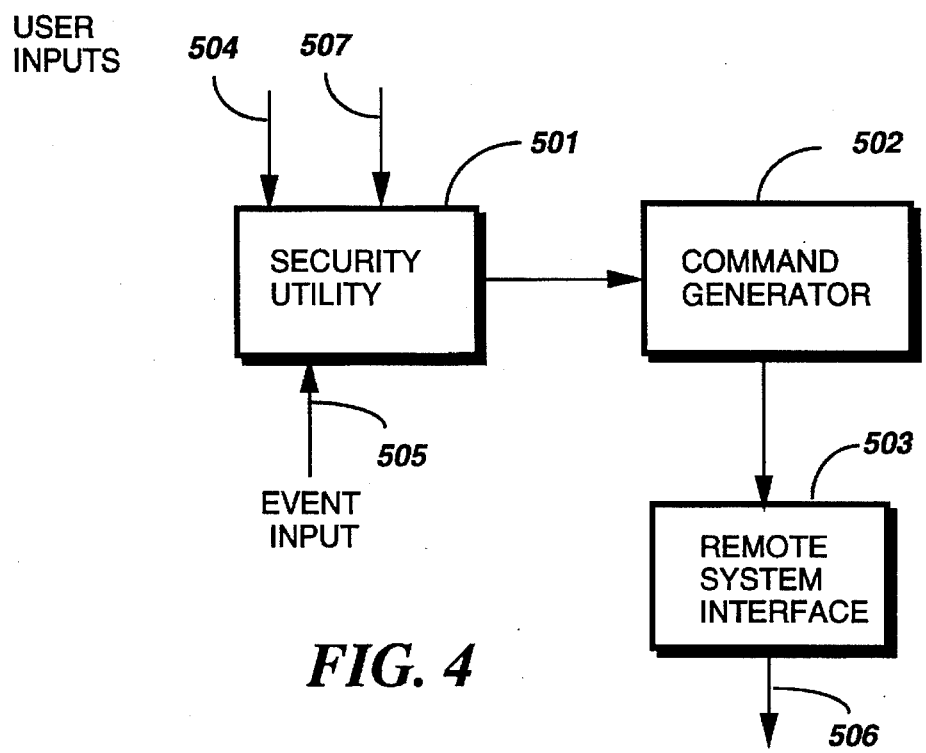
FIG. 4 is an electrical block diagram of an input terminal used in the remote controlled lock system, in accordance with the preferred embodiment of the present invention.

Referring to FIG. 4, an electrical block diagram of a portion of the computer 111, in accordance with the preferred embodiment of the present invention. The computer 111 is also hereafter referred to the input terminal 111. The input terminal 111 is preferably a Macintosh Centris™ 650 model computer manufactured by Apple Computer, Inc. of Cupertino, Calif., which comprises a lock command generator 502 coupled to a security utility 501 and a remote lock interface 503. The lock commands are automatically generated at an output 506 of the remote lock interface 503 when the security mode of the input terminal 111 changes from a lock state to an unlock state or from an unlock state to a lock state. The security mode of the input terminal 111 is controlled by the security utility 501, which is preferably the Safety Suite software, supplied by Claris Corp. of Cupertino, Calif., but which alternatively may be a unique program or any of a number of security software programs such as ultraSheild security software published by UsrEZ Co. of Irvine, Calif. or Empower I security software published by Magna of San Jose, Calif., or After Dark screen saver software, supplied by Berkeley Systems of Berkeley, Calif.

The security utility 501 includes at least one lock condition and one unlock condition, changes of which are generated by the security utility and communicated from the security utility 501 to the command generator 502. For example, the lock and unlock conditions can be associated in the security utility 501 with a privacy condition of a display screen of the input terminal (commonly referred to as a screen saving state), or to an access condition of a disk memory of the input terminal 111, as provided in the Safety Suite software. The change of the security mode of the input terminal 111 to an unlock state is preferably associated with a change of access condition in the security utility 501 requiring a password entry (which is a user input 507). The change of the security mode of the input terminal 111 to a lock state is preferably associated with any one of three changes of condition in the security utility 501: a menu selection (which is a user input 507), a duration without keyboard activity (which is a response to an event 505) and the occurrence of a predetermined time of day (which is a response to an event 505). Alternatively, other inputs can be used to initiate a change of condition in the security utility 501.

When a change to an unlock or lock condition is communicated to the command generator 502, the command generator 502 generates one or more of the lock commands, which commands include a lock instruction when the security mode is changed from the unlock state to the lock state, or include an unlock instruction when the security mode is changed from the lock state to the unlock state. It will be appreciated that the security utility 501 includes a number of lock and unlock conditions, such as for different files, different memory devices, and one or more display screens, for which changes are generated by a variety of inputs, as described above. The security mode of the input terminal 111 is determined by changes of one or more of such conditions in a logical combination by the command generator 502, as described above. When the command generator 502 determines from condition changes communicated from the security utility that a change of mode of the input terminal 111 has occurred, the command generator generates a lock command for each of a set of predetermined remote lock devices 105, including in each lock command a selective call receiver identity for a receiver of each of the set of predetermined remote lock devices 105. In some remote lock systems, such as some paging systems, the selective call receiver identity is equivalent to a phone number. The remote lock interface 503 communicates the lock commands in the form of serial data messages to the system controller 102, typically through the PSTN 108. For increased security, the lock command includes a series of digits predetermined by the user of the input terminal 111 for each of the lock and unlock instructions. The command generator 502 is a preferably a unique set of program instructions which is stored in the input terminal 111. The remote interface is preferably the Advise™ program supplied by Motorola Inc. of Schaumburg, Ill., which is stored in the input terminal and communicates the lock commands to the system controller 102 via the communications output port 506 and an external telephone modem well known to one of ordinary skill in the art.

When the system controller 102 receives the lock command, the system controller 102 uses the subscriber data base 440 (FIG. 2) to generate a selective call receiver address corresponding to the identity of the corresponding remote lock device 105 and a lock or an unlock digital code corresponding to the lock or unlock instruction received in the command for each remote lock device 105. The lock and unlock codes can be different for each remote lock device 105. The system controller 102 combines the selective call address and the lock or unlock digital code for each remote lock device 105 into a digital message which is transmitted in a radio signal under control of the communication interface 402 (FIG. 2) to the remote lock device 105 via the transmitter station 109.

It will be appreciated that a user can optionally dial up the system controller at the telephone 101, the desktop input unit 113 (such as a desktop page entry terminal), or the telephone/desktop input unit combination input terminal 115, and manually enter the selective call address and a lock or unlock instruction, thereby activating the locks when away from the input terminal 111.

Figure 5:
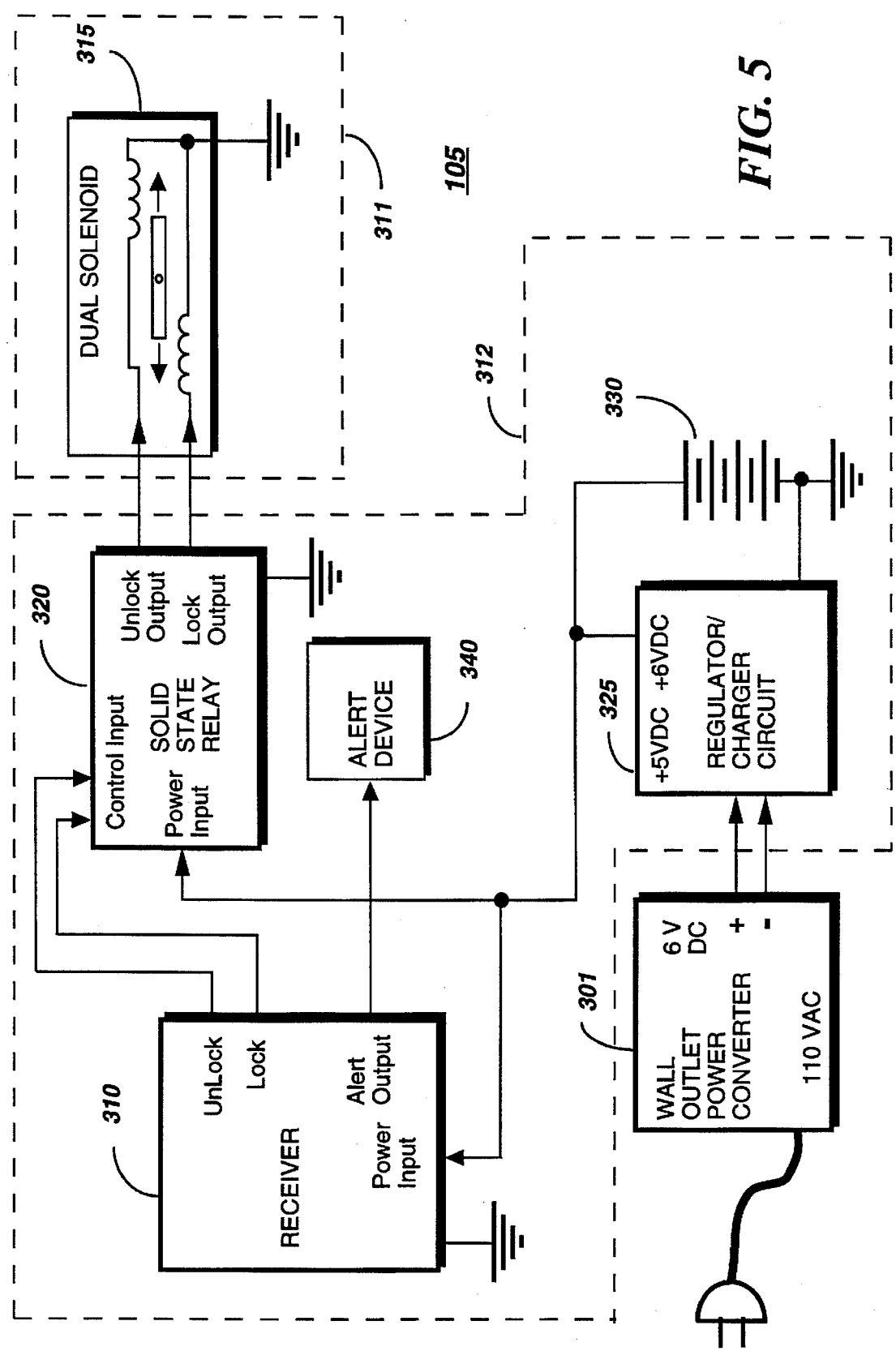
FIG. 5 is an electrical block diagram of the remote lock device, in accordance with the preferred embodiment of the present invention.

Referring to FIG. 5, an electrical block diagram of the remote lock device 105 installed in the desk 120 (FIG. 3) is shown, in accordance with a preferred embodiment of the present invention. As described above, the remote lock device 105 comprises the wall outlet power converter 301 and the lock box 302. The lock box 302 (not shown in FIG. 5) comprises an electromagnetic lock device portion 311 and an electrical control portion 312. The electromagnetic lock device portion 311 comprises mechanical parts which are described below and a dual solenoid 315. The electrical control portion 312 comprises a receiver 310, a solid state relay 320, a regulator/charger circuit 325, one or more batteries 330, and an alert device 340. The receiver 310 is coupled to the control inputs of the solid state relay 320, to the alert device 340, and to a regulated output of the regulator/charger circuit 325. The wall outlet power converter 301 is coupled to the regulator/charger circuit 325. The batteries 330 are coupled to the regulator/charger circuit 325, to the receiver 310, and to the power input of the solid state relay 320. The lock and unlock outputs of the solid state relay 320 are coupled to the dual solenoid 315. The wall outlet power converter 301 converts AC mains power in the range from 90 to 240 VAC (typically 115 VAC in the U.S.A.) to 6 volts DC, which is coupled to the regulator/charger circuit 325. The regulator/charger circuit 325 supplies current to recharge the batteries 330 at a varying voltage. The batteries 330 provide a high power, low resistance source of energy to the dual solenoids 315 when the receiver 310 enables one of the control outputs of the solid state relay 320, and supply a continuous small amount of power to the receiver 310. The alert device 340 is activated by the receiver 310 when there is a problem with the power, such as a low charge state of the batteries 330 or to give an indication of other conditions, such as the type of lock code received. The lock box 302 provides physical security for the electromagnetic lock device portion 311 and the electrical control portion 312, requiring a security tool to open, or being inaccessible when the item is locked. A door (not shown) in the lock box 302 permits access to the batteries 330 but not to the rest of the contents of the lock box 302. It will be appreciated that the presence of the batteries is not required to maintain the position of a locking member of the remote lock device 105 in a locked or unlocked position. It will be appreciated that the wall outlet power converter 301 and lock box 302 can operate at other DC voltages, using alternative conventional electrical parts.

The wall outlet power converter 301, the regulator/charger circuit 325, and the solid state relay 320, are commonly available electronic components in circuit configurations well known to one of ordinary skill in the art. The batteries 330 are preferably four AA rechargeable batteries of the Nickel Cadmium type, but alternatively can be primary cells of conventional type. The dual solenoids are preferably model 22-I-6D DC solenoids manufactured by Guardian Electric Manufacturing Co., of Woodstock, Ill., but alternative conventional solenoids can be used. The receiver 310 is described more fully below. The relay 320 can alternatively be a conventional electromechanical relay.

It will be appreciated that alternative configurations to supply power for the remote lock device 105 are appropriate, depending on a variety of circumstances. For example, when AC power is not located near the remote lock device 105, the power may be supplied by using only the batteries 330. Alternatively, when the remote lock device is positioned such that the batteries 330 are not accessible, the remote lock device 105 can be powered solely by the wall outlet power converter 301, in which case the wall outlet power converter 301 is necessarily larger so as to be able to source high currents needed by the electromagnetic lock device portion 311 of the remote lock device 105 when changing the position of the locking member.

Figure 6:
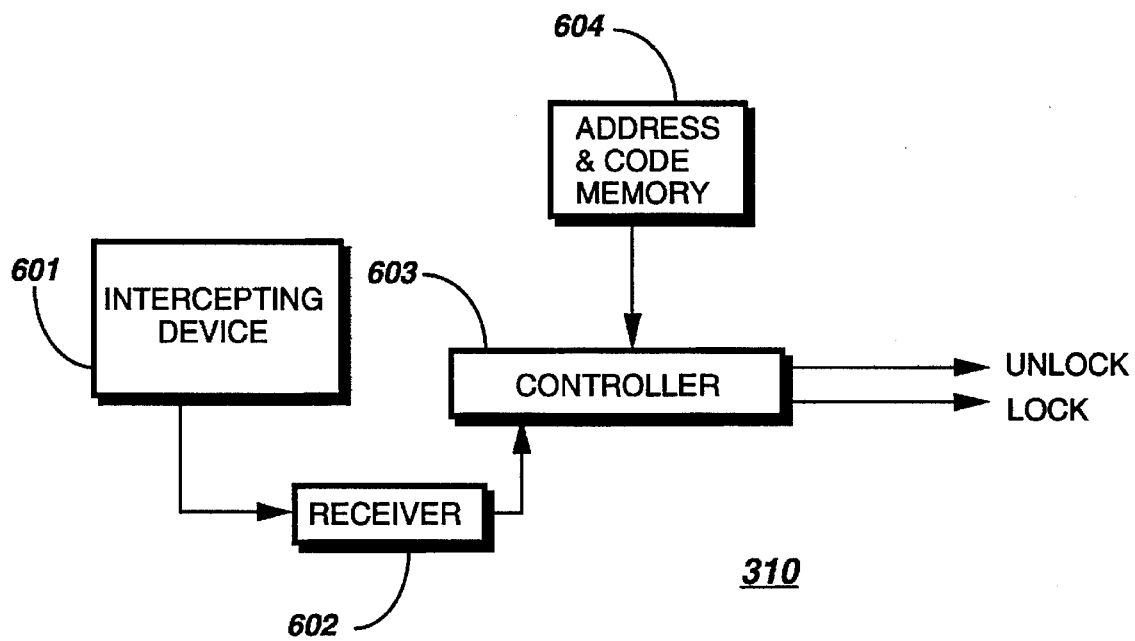
FIG. 6 is an electrical block diagram of a selective call receiver used in the remote lock device, in accordance with the preferred embodiment of the present invention.

Referring to FIG. 6, the receiver 310 used in the remote lock device 105 is shown, in accordance with the preferred embodiment of the present invention. The receiver 310 is a selective call receiver which comprises a intercepting device 601, a receiver module 602, a controller 603, and an address/code memory 604. The intercepting device 601 is coupled to the receiver module 602. The receiver module 602 and the address/code memory 604 are coupled to the controller 603. In the preferred embodiment of the present invention, the intercepting device 601 is a radio frequency antenna which intercepts the signal transmitted by the transmitter station 109. The receiver module converts, filters, and demodulates the signal. The demodulated signal, including the selective call address and one of the lock code and the unlock code, is decoded by the controller 603. When the received selective call address matches a predetermined address stored in the address/code memory 604 and the one of the lock code and the unlock code matches a predetermined corresponding one of a lock and unlock code stored in the address/code memory 604, the controller 603 generates one of a lock signal and an unlock signal corresponding to the lock or unlock code received. The generated lock and unlock signals have a predetermined duration.

In the preferred embodiment of the present invention, the intercepting device 601 and the receiver module 602 are preferably an antenna and a selective call receiver module from a FreeSpirit® model pager manufactured by Motorola, Inc., of Schaumburg, Ill., but many other radio receiving devices are equally usable. The controller 603 and address/code memory 604 preferably comprise a microprocessor such as one of the 68HC05 family manufactured by Motorola, Inc. of Schaumburg, Ill., and may also comprise application specific integrated circuits which implement functions such as a signal processor (e.g., a filter and decoder), a conventional signal multiplexer, and a voltage regulator that may supply a regulated voltage to other portions of the receiver 310. Alternatively, the associated controller 603 may include circuits such as digital logic, analog to digital converters, digital to analog converters, programmable input-output ports, a control bus, control interface circuitry, and a clock or local oscillator frequency synthesizer. The controller 603 includes program instructions uniquely to perform the functions described herein for the remote lock system 100.

Figure 7:
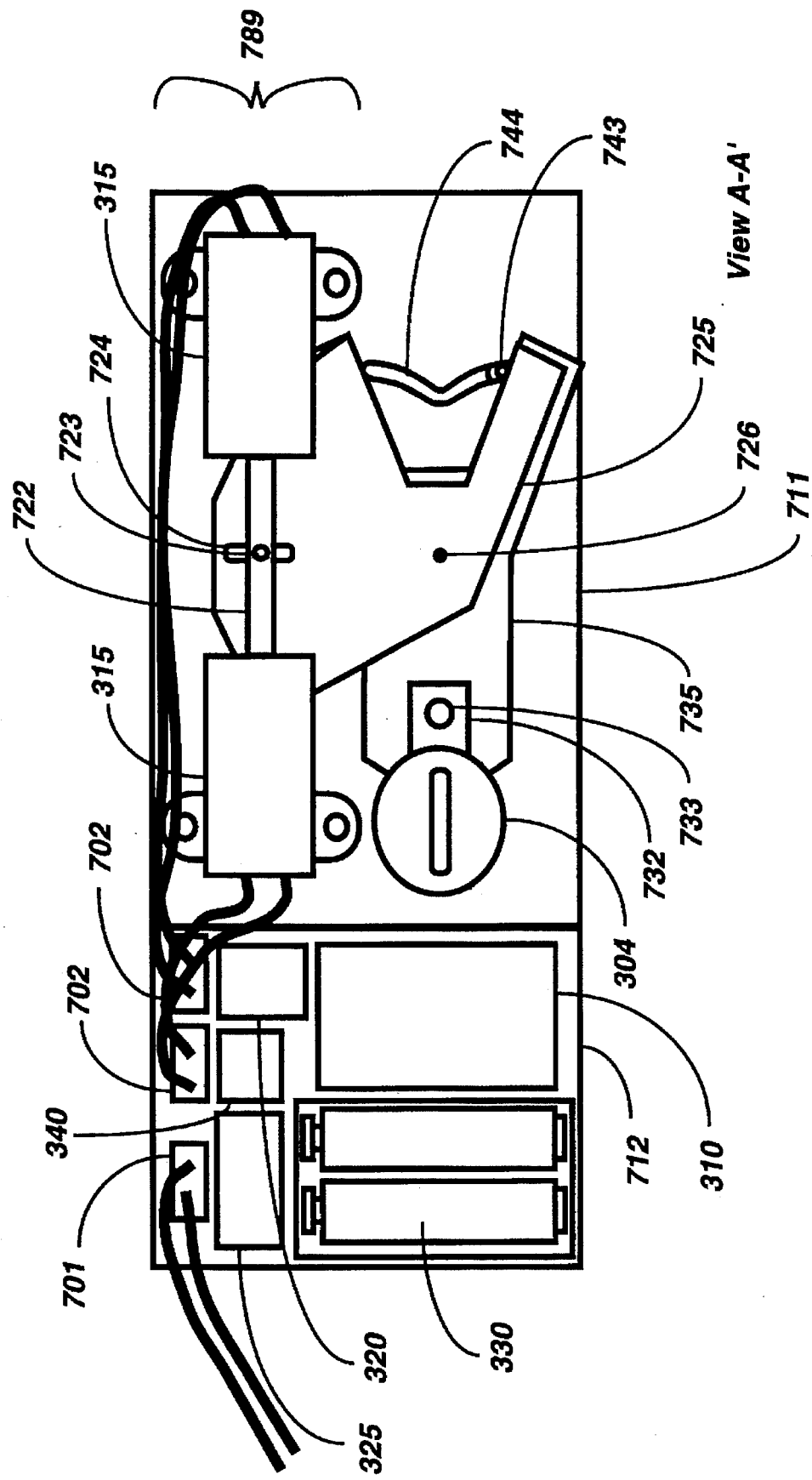
FIG. 7 is a mechanical diagram of the remote lock device showing an electromagnetic lock device portion and an electrical control portion from a first view, in accordance with the preferred embodiment of the present invention.

Referring to FIG. 7, a mechanical diagram of the electromagnetic lock device portion 311 and the electrical control portion 312 of the remote lock device 105 is shown from view A-A' of FIG. 3, in accordance with the preferred embodiment of the present invention. The electrical control portion 312 comprises the receiver 310, the solid state relay 320, the regulator/charger circuit 325, the one or more batteries 330, and the alert device 340 described above, and further comprises a power cord 701 connected to the wall outlet power (not shown in FIG. 7), cables 702 connected to the dual solenoids 315, and a support plate 712. The electromagnetic lock device portion 311 comprises a bidirectional electromechanical actuator 789, a solenoid cam 725 having a solenoid cam slot 724, the keyed mechanical lock 304, a mechanical lock bar 732, a mechanical lock pin 733, a mechanical lock cam 735, a cam pin 726, a latch guide pin slot 744, a latch guide pin 743, and a support plate 711. The bidirectional electromechanical actuator 789 comprises the dual solenoids 315, a solenoid bar 722, and a solenoid pin 723. The solenoid cam 725 and the mechanical lock cam 735 are rotatably coupled to the cam pin 726. The solenoid bar 722 is slidably coupled to the dual solenoids 315. The solenoid pin 723 is rigidly attached to the solenoid bar 722. The solenoid pin 723 rides in the solenoid cam slot 724 and drives the solenoid cam 725 in one of two rotational directions about the cam pin 726, when one of the dual solenoids 315 is activated. The mechanical lock bar 732 is rigidly coupled to the mechanical lock 304. The mechanical lock pin 733 is rigidly attached to the mechanical lock bar 732. The mechanical lock pin 733 rides in a mechanical lock cam slot (not shown in FIG. 7), and drives the mechanical lock cam 735 in one of two rotational directions about the cam pin 726, when the mechanical lock 304 is rotated in one of two rotational directions when a key is inserted and twisted by a user. All individual elements of the electromechanical portion 711 are conventional elements, uniquely assembled to perform the locking functions described herein.

Figure 8:
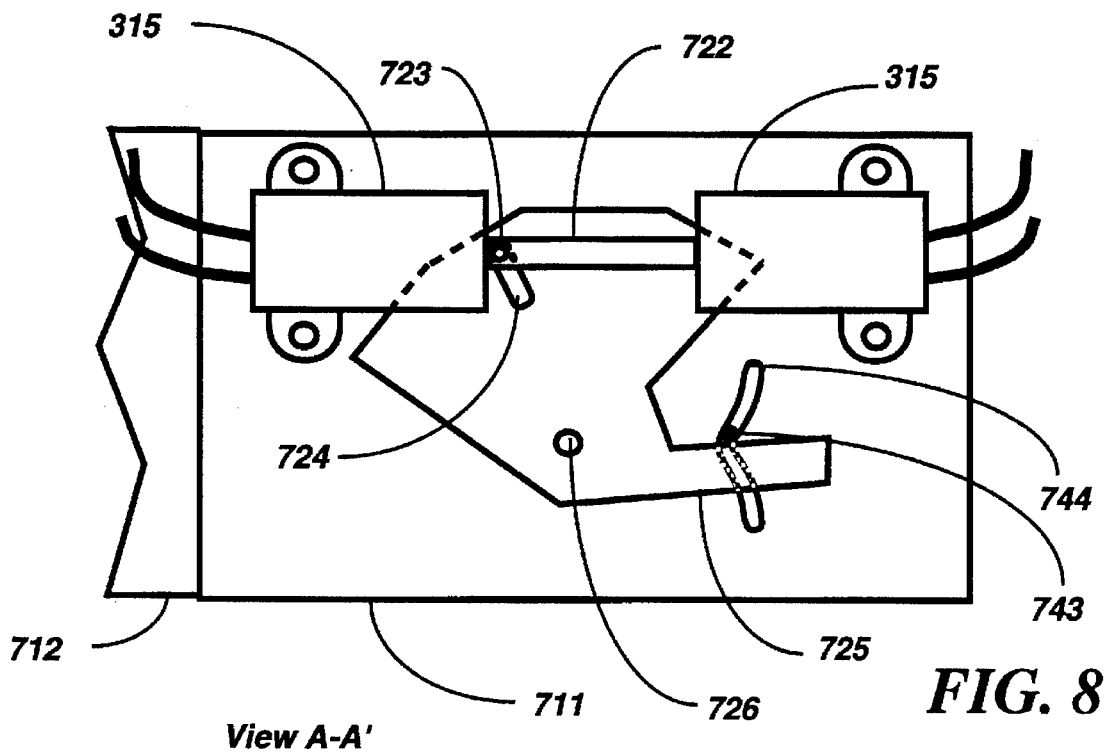
FIG. 8, FIG. 9 FIG. 10, and FIG. 11 are mechanical diagrams showing aspects of the electromagnetic lock device portion of the remote lock device from the first view, in accordance with the preferred embodiment of the present invention.
Figure 9:
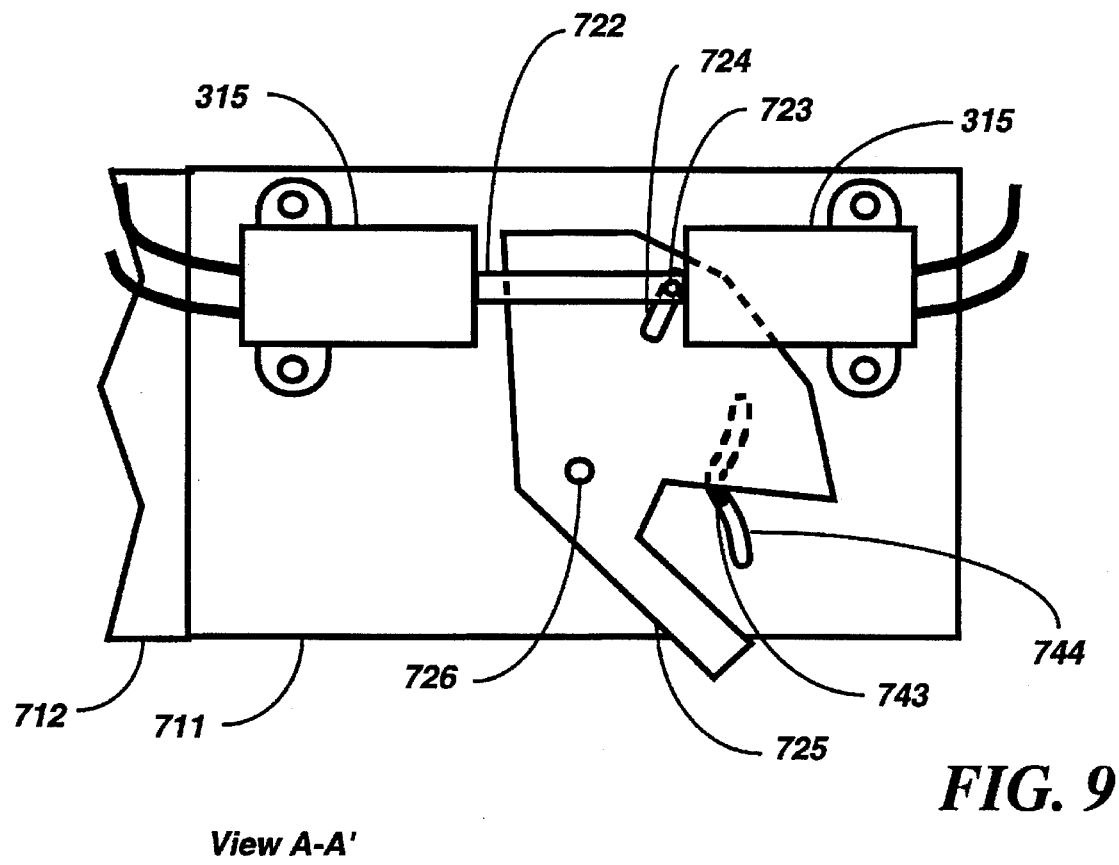
Figure 10:
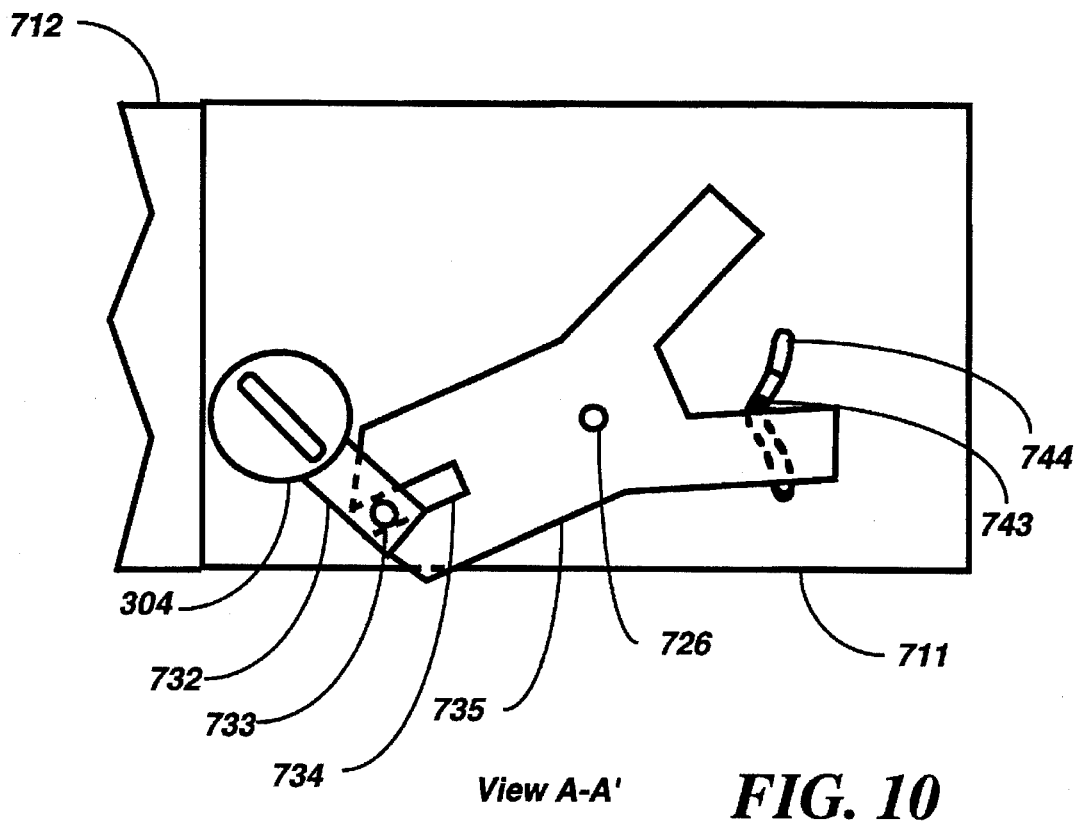
Figure 11:
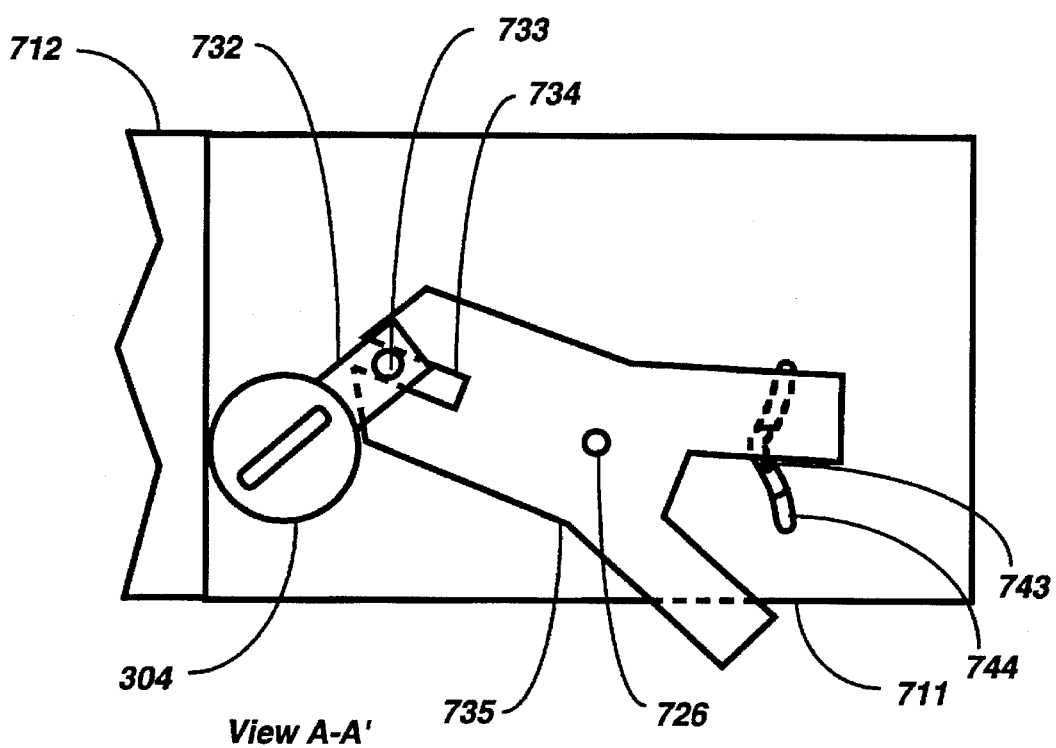

Referring to FIG. 8, FIG. 9, FIG. 10 and FIG. 11, mechanical diagrams show aspects of the electromagnetic lock device portion 311 of the remote lock device 105 from view A-A' of FIG. 3, in accordance with the preferred embodiment of the present invention. FIG. 8 shows the dual solenoids 315 after the unlock signal has been applied by the electrical portion 312. It will be appreciated that the solenoid cam 725 drives the latch guide pin 743 into an upper half of the latch guide pin slot 744, somewhat past the middle of the latch guide pin slot 744. FIG. 9 shows the dual solenoids 315 after the lock signal has been applied by the electrical portion 312. It will be appreciated that the solenoid cam 725 drives the latch guide pin 743 into a lower half of the latch guide pin slot 744, somewhat past the middle of the latch guide pin slot 744. FIG. 10 shows the mechanical lock 304 when the key is twisted by the user in a rotational direction for locking. It will be appreciated that the mechanical lock cam 735 drives the latch guide pin 743 into the upper half of the latch guide pin slot 744, somewhat past the middle of the latch guide pin slot 744. FIG. 11 shows the mechanical lock 304 when the key is twisted by the user in a rotational direction for unlocking. It will be appreciated that the mechanical lock cam 735 drives the latch guide pin 743 into the lower half of the latch guide pin slot 744, somewhat past the middle of the latch guide pin slot 744. It will be appreciated that, when the dual solenoids 315 and mechanical lock 304 are not activated, neither the solenoid cam 725 nor the mechanical lock cam 735 impedes movement of the latch guide pin 743 in the latch guide pin slot 744, and that when either one of the solenoid cam 725 and mechanical lock cam 735 is not activated, the one cam not activated does not impede the other cam from driving the latch guide pin 743 in the latch guide pin slot 744 when the other cam is activated.

Figure 12:
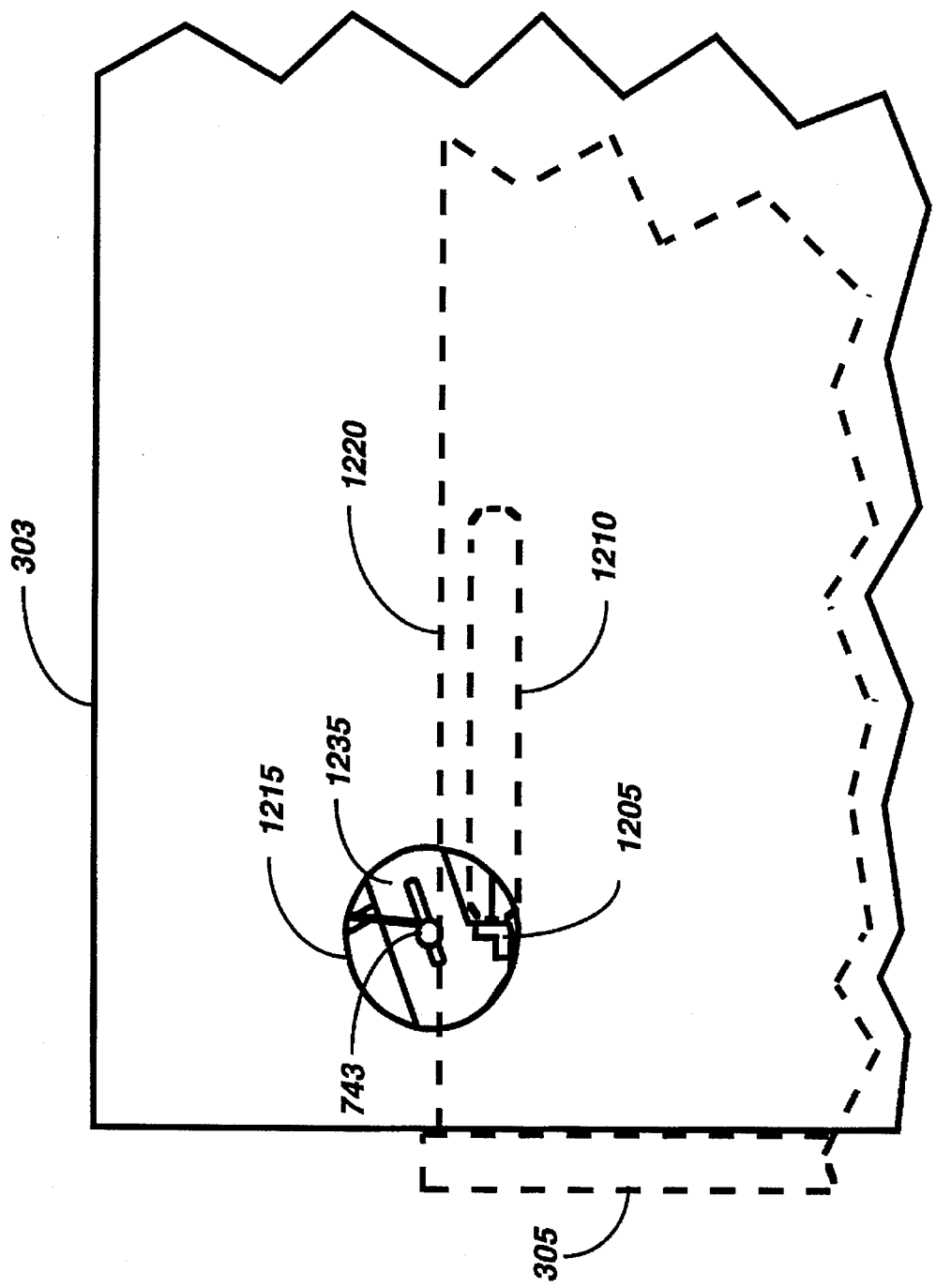
FIG. 12, FIG. 13, FIG. 14, FIG. 15, and FIG. 16 are mechanical diagrams showing aspects of the electromagnetic lock device portion of the remote lock device and portions of the desk from a second view, in accordance with the preferred embodiment of the present invention.
Figure 13:
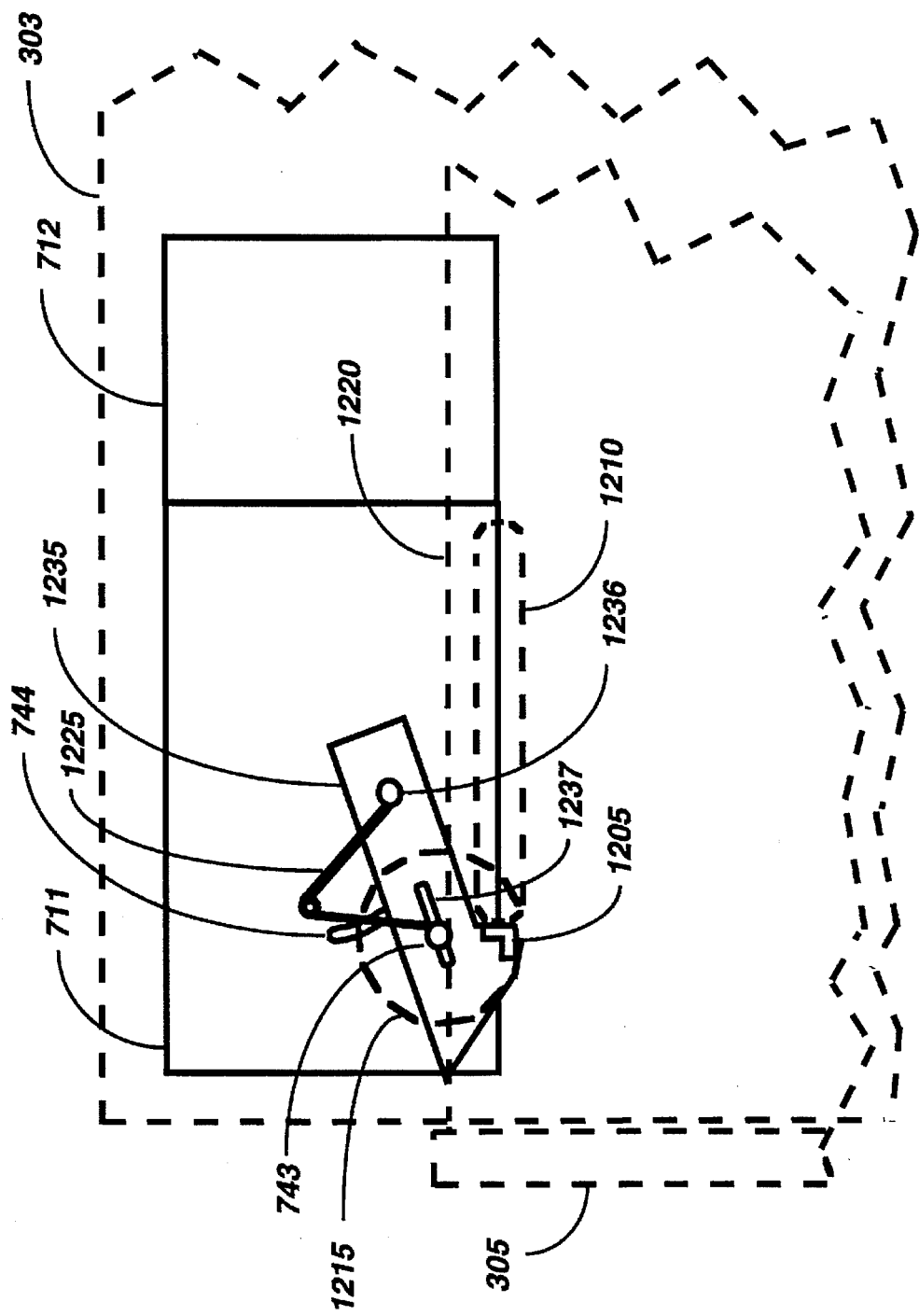
Figure 14:
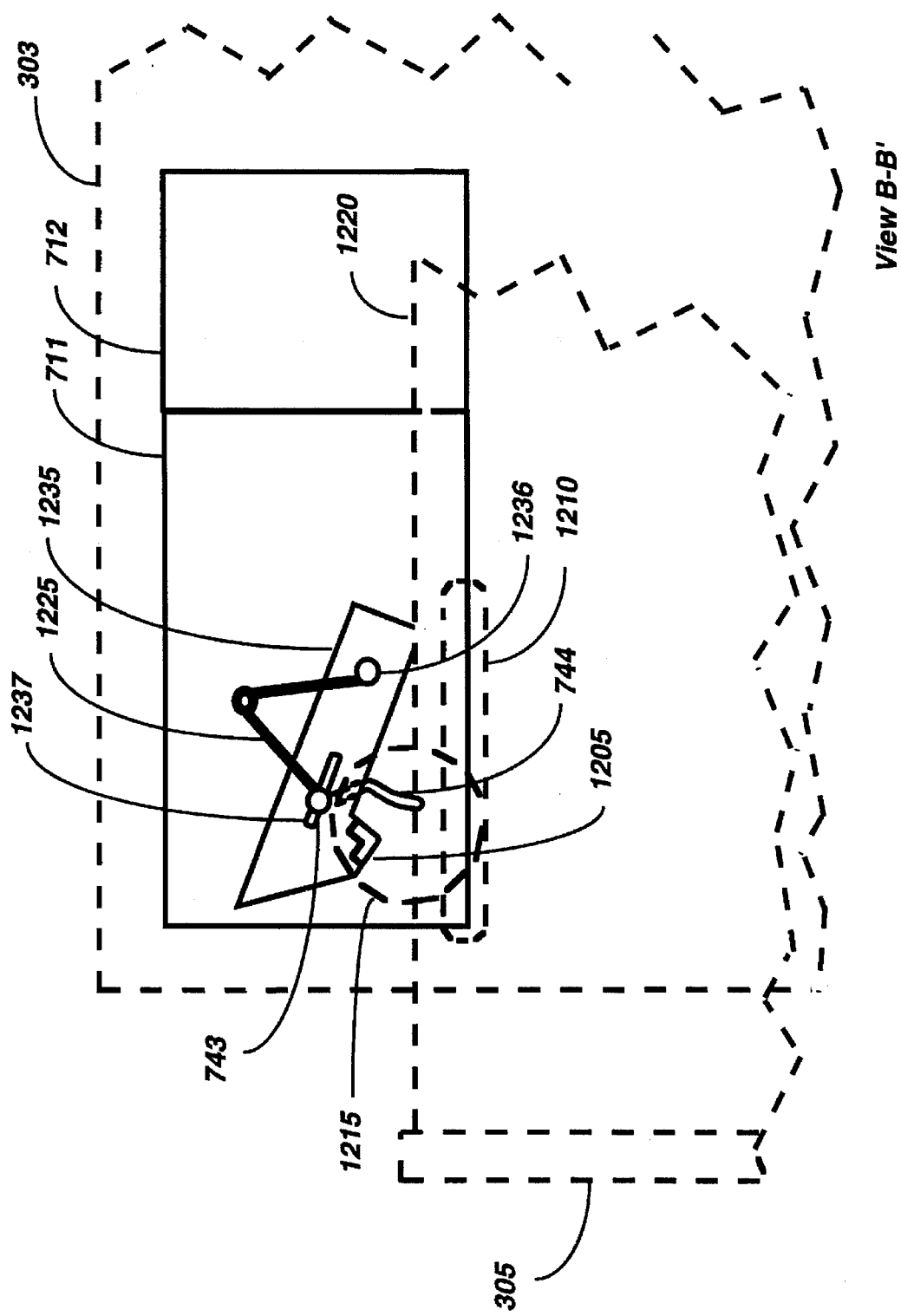

Referring to FIG. 12, FIG. 13, and FIG. 14, mechanical diagrams show aspects of the electromagnetic lock device portion 311 of the remote lock device 105 from view B-B' of FIG. 3, in accordance with the preferred embodiment of the present invention. FIG. 12 shows the desk partition 303 having a hole 1215 therein which allows a locking member 1205, which is rigidly affixed to a latch 1235, to protrude therethrough. For reference, the drawer 305 and the top edge of the left side 1220 of the drawer 305 are shown in dotted lines. The drawer 305 has a lock stop 1210 affixed thereto just below the top edge 1220, between the drawer 305 and the partition 303. The lock stop is also shown for reference in dotted lines. The locking member 1205 is in a locked position directly in front of the lock stop 1210, which prevents the drawer 305 from opening. An end of the latch guide pin 743 is visible in FIG. 12. FIG. 13 shows all items in the same position as FIG. 12. In FIG. 13, the drawer 305, the lock stop 1210, the partition 303, the hole 1215, and the top edge of the left side 1220 of the drawer 305 are shown for reference in dotted lines. A bi-stable mechanical latch comprises a latch 1235, a latch pin 1236, a V shaped latch spring 1225, and the latch guide pin 743. The latch 1235 is rotatably coupled to the support plate 711 by the latch pin 1236. The V shaped latch spring 1225 is rotatably coupled to the latch guide pin 743 and the latch pin 1236, and is under compression in all positions of the latch 1235. The latch 1235 has a latch slot 1237, in which the latch guide pin 743 rides. The latch guide pin 743 is near the bottom of the latch guide pin slot 744, and the latch 1235 is in the locked position. FIG. 14 shows the same items as FIG. 13, with the latch guide pin 743 near the top of the latch guide pin slot 744, such that the latch 1235 is in an unlocked position and the drawer 305 is partially open.

Figure 15:
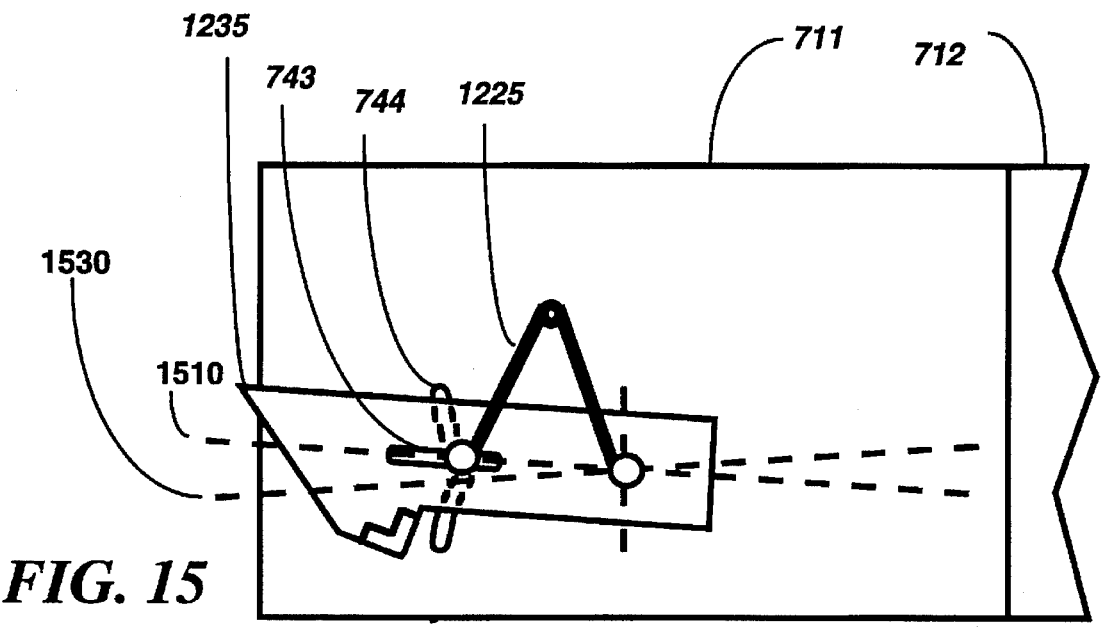

Referring to FIG. 15, a mechanical diagram shows an aspect of the electromagnetic lock device portion 311 of the remote lock device 105 from view B-B' of FIG. 3, in accordance with the preferred embodiment of the present invention. An upper minimum angle 1510 and a lower minimum angle 1530 are shown in FIG. 15. When the latch guide pin 743 is at or above the upper minimum angle 1510 and is not otherwise blocked, the latch 1235 will be pushed to the unlocked position shown in FIG. 14 by the spring 1225, and when the latch guide pin 743 is at or below the lower minimum angle 1530 and is not otherwise blocked, the latch 1235 will be pushed to the locked position by the spring 1225. When the latch guide pin 743 is in between the upper minimum angle 1510 and the lower minimum angle 1530, the latch 1235 will be pushed in either the upwards or downwards direction when the friction forces between the latch guide pin 743, the latch slot 1237 and the latch guide pin slot 744 are less than the force of the V shaped latch spring 1225. Thus, the bi-stable mechanical latch has two stable positions: unlocked and locked, wherein the latch guide pin 743 is near the top or the bottom, respectively, of the latch guide pin slot 744.

Figure 16:
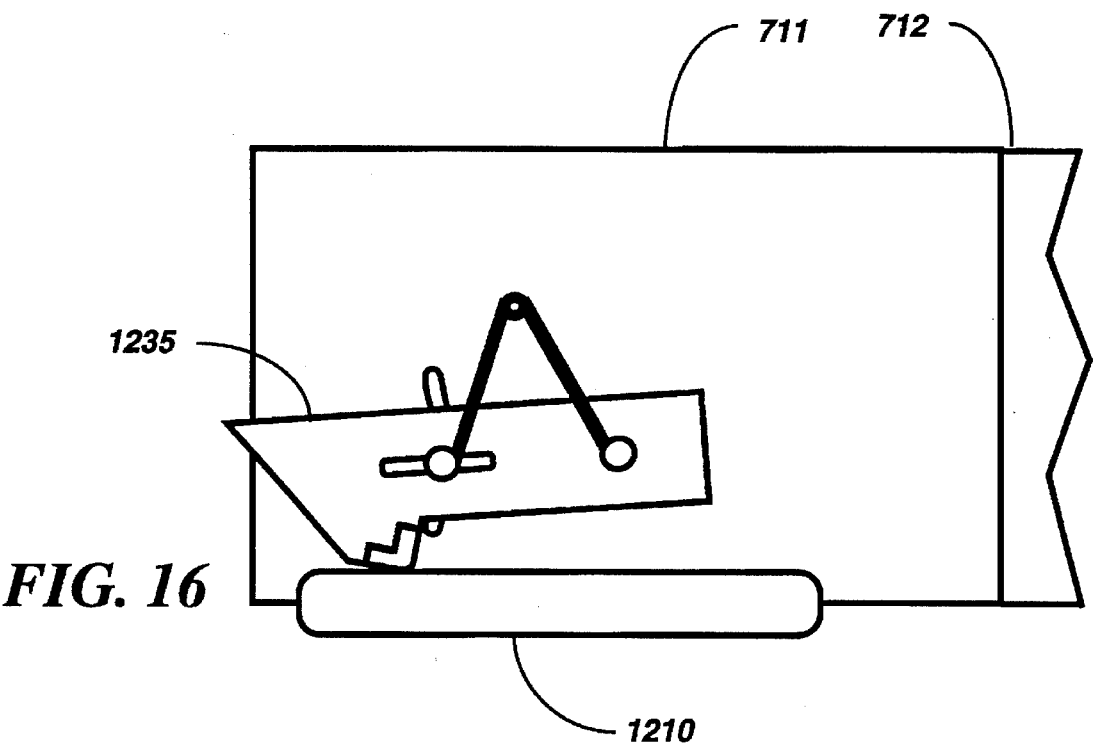

Referring to FIG. 16, a mechanical diagram shows an aspect of the electromagnetic lock device portion 311 of the remote lock device 105 from view B-B' of FIG. 3, in accordance with the preferred embodiment of the present invention. The latch guide pin 743 is past the lower minimum angle 1530, but is blocked by the lock stop 1210. The latch 1235 will move to the locked position shown in FIG. 13 when the drawer 305 is closed, and when the locking member 1205 is not blocked by the lock stop 1210, nor otherwise blocked. It will be appreciated that the bi-directional electromechanical actuator need only be activated by the lock or unlock signal long enough to move the bi-stable mechanical latch past one of the minimum angles 1510 or 1530.

It will also appreciated that alternative means of bi-directional electromechanical actuation are possible, such as a conventional bi-directional DC motor which is axially coupled to the solenoid cam 725 at the point of rotational coupling between the solenoid cam 725 and the support plate 711. The choice of bi-directional electromechanical actuation means is influenced by the physical dimensions desired for the lock box 302. It will also be appreciated that the physical arrangement of the contents of the lock box 302 can be re-arranged to accommodate restrictions in the design of the item being locked. For example, to have a narrow width of a file cabinet, the bi-directional mechanical actuator and the mechanical lock 304, can be separated from the remaining items in the lock box 302 by using conventional link rods connecting the bi-directional mechanical actuator and the mechanical lock 304 to the cams 725. It will also be appreciated that the mechanical lock 304 could be coupled to the latch guide pin 743 by alternative means, such as by directly coupling the mechanical lock 304 to the mechanical lock cam 735 at the point of rotational coupling of the mechanical lock cam 735 to the support plate 711, and that other types of mechanical locks could be used, such as a mechanical push button lock which releases a lockable manual rotator (e.g., a wing nut shaped rotator such as are common for dead-bolt locks).

Figure 17:
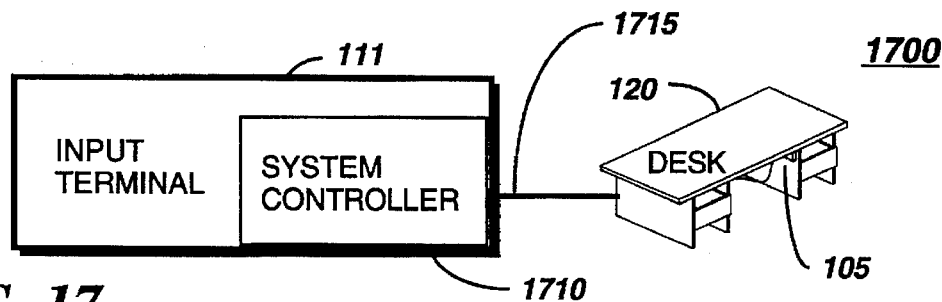
FIG. 17 is an electrical block diagram of the remote controlled lock system, in accordance with a first alternate embodiment of the present invention.

Referring to FIG. 17, an electrical block diagram of a remote lock system 1700 is shown, in accordance with a first alternate embodiment of the present invention. The input terminal 111 comprises the functional blocks described above as shown in FIG. 4, and the operation of the input terminal 111 includes the functions described above. The input terminal 111 further comprises a system controller 1710 located within the input terminal. The input terminal 111 is connected to one or more remote lock devices 105 by one or more cables 1715. The input terminal is preferably the Macintosh Centris™ 650 model computer manufactured by Apple Computer, Inc., of Cupertino, Calif., equipped with the programs and hardware as described above.

Figure 18:
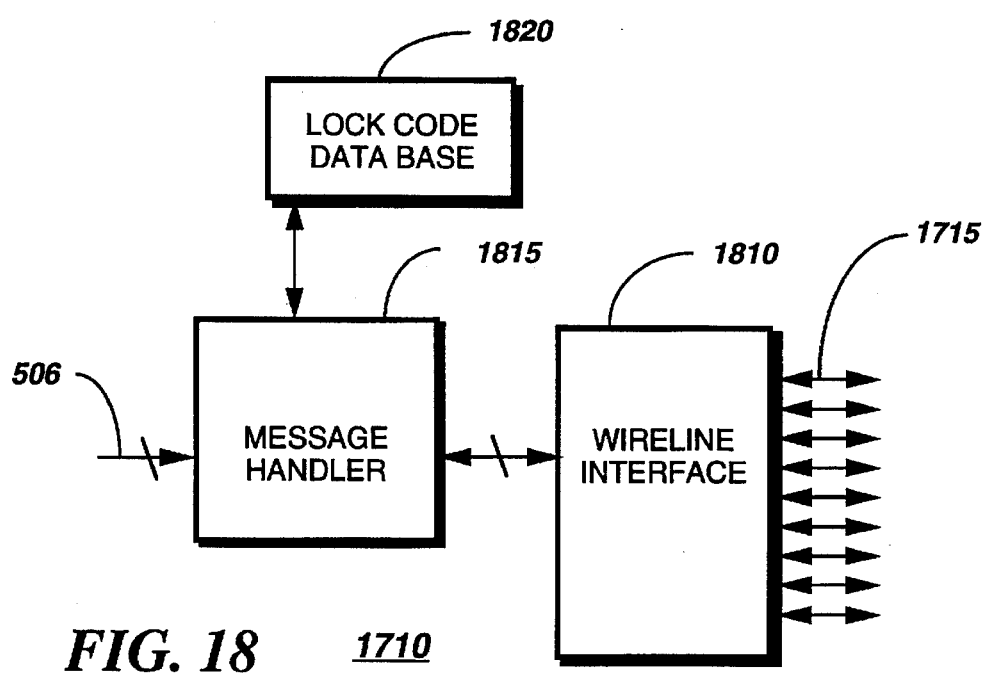
FIG. 18 is an electrical block diagram of a system controller used in the remote controlled lock system, in accordance with the first alternate embodiment of the present invention.

Referring to FIG. 18, an electrical block diagram of the system controller 1710 is shown in accordance with the first alternate embodiment of the present invention. The system controller 1710 comprises a message handler 1815, a lock code data base 1820, and a wireline interface 1810. The message handler 1815, which routes and processes messages, is coupled to the output 506 of the remote system interface 503 of the input terminal 111 and is further coupled to the wireline interface 1810 and the lock code data base 1820. The wireline interface 1810 handles serial communication of the lock commands from the message handler 1815 to the remote lock devices 105 via the one or more cables 1715, and provides proper voltages for driving the cables 1715. The lock code data base 1820 stores a correlation between a lock instruction and a lock code and a correlation between an unlock instruction and an unlock code for each of the remote lock devices 105.

When the system controller 1710 receives the lock command, the controller 1710 uses the lock code data base 1820 to generate a lock or an unlock digital code corresponding to the lock or unlock instruction received in the command for each remote lock device 105 identified in the lock command. The lock and unlock codes can be different for each remote lock device 105. The system controller 1710 includes the lock or unlock digital code into a digital message which is transmitted to each of the remote lock devices 105 via a cable 1715 connected to the remote lock wireline interface 1810, preferably using an analog signal suitable for low cost wireline digital interfaces, such as a low speed modem signal well known to one of ordinary skill in the art.

The system controller 1710 is preferably a conventional serial communications card which is installed in an option slot of the input terminal 111, with the message handler 1815 being a unique program stored in the input terminal 111, and with the lock code data base comprising data stored in the input terminal 111. The wireline interface 1715 is preferably one or more conventional serial output integrated circuits, well known to one of ordinary skill in the art.

Figure 19:
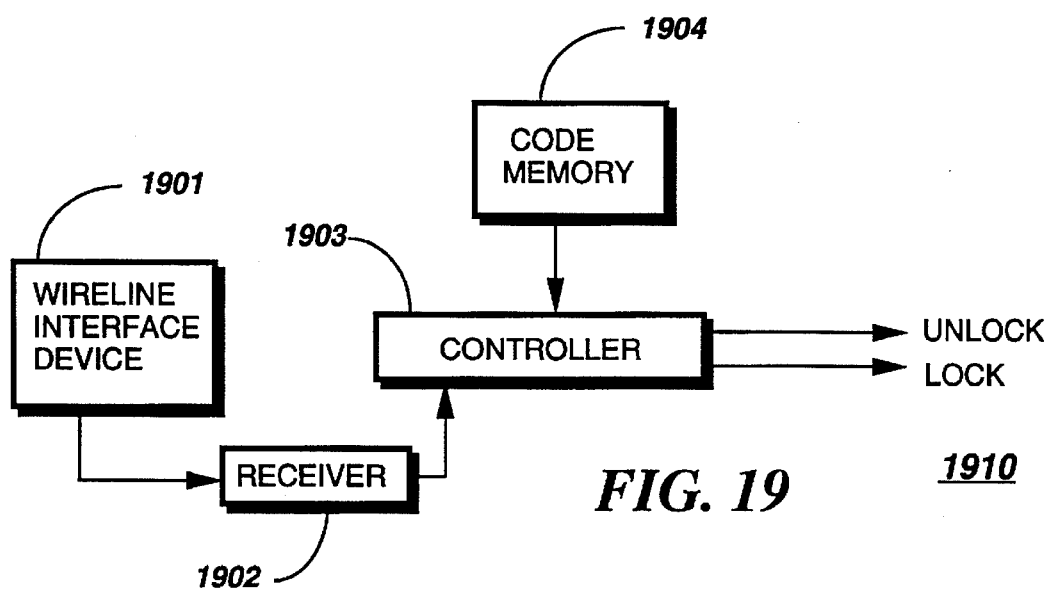
FIG. 19 is an electrical block diagram of a wireline receiver used in the remote lock device, in accordance with the first alternate embodiment of the present invention.

Referring to FIG. 19, an electrical block diagram of a wireline receiver 1910 is shown, in accordance with the first alternate embodiment of the present invention. The wireline receiver 1910 is used in place of the receiver 310 in the remote lock device 105 described above. The wireline receiver 1910 comprises a wireline interface 1901, a receiver module 1902, a controller 1903, and a code memory 1904. The wireline interface 1901 is coupled to the receiver module 1902. The receiver module 1902 and the code memory 1904 are coupled to the controller 1903. The wireline interface 1901 receives the analog wireline signal from the system controller 1710. The receiver module filters and demodulates the signal. The demodulated signal, including the one of the lock code and the unlock code, is decoded by the controller 1903. When the one of the lock code and the unlock code matches a predetermined corresponding one of a lock and unlock code stored in the code memory 1904, the controller 1903 generates one of a lock signal and an unlock signal corresponding to the lock or unlock code received. The generated lock and unlock signals have a predetermined duration.

The wireline interface circuit 1901 is preferably a conventional line receiver integrated circuit. The receiver 1902, the control circuit 1903 and the code memory 1904 preferably comprise a microprocessor such as one of the 68HC05 family manufactured by Motorola, Inc. of Schaumburg, Ill., and may also comprise application specific integrated circuits which implement functions such as a signal processor (e.g., a filter and decoder), a conventional signal multiplexer, and a voltage regulator that may supply a regulated voltage to other portions of the receiver 1910. Alternatively, the associated controller 1903 may include circuits such as digital logic, analog to digital converters, programmable input-output ports, and a clock or local oscillator frequency synthesizer. The controller 1903 includes instructions uniquely designed for interworking with the remote lock system 100.

It will be appreciated that the unlock and unlock codes are transmitted from the system controller 1710 to the wireline interface device 1901 in a digital message for reasons of security, as contrasted to using simply a three wire logic cable conveying the lock and unlock signals, which could be easily compromised. Further, in a wireline system as described, no selective call address is needed since a different cable is connected to each remote lock device 105. In an alternate wireline system, such as one using a ring interconnect, wherein more than one remote lock device 105 is connected to the same cable (or extension thereof), a selective call address is included in the digital signal.

Figure 20:
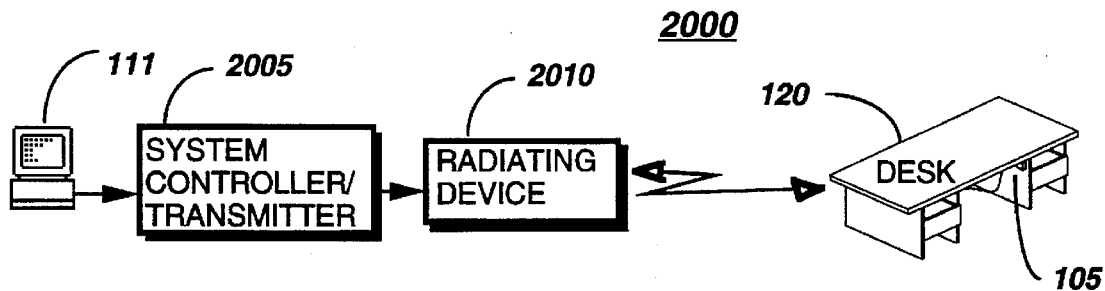
FIG. 20 is an electrical block diagram of the remote lock system, in accordance with second and third alternate embodiments of the present invention.

Referring to FIG. 20, an electrical block diagram of a remote lock system 2000 is shown, in accordance with second and third alternate embodiments of the present invention. The remote lock system 2000 comprises a system controller/transmitter 2005 coupled to the input terminal 111 and a radiating device 2010. The system controller/transmitter 2005 and the radiating device 2010 in the second alternate embodiment of the present invention are used in conjunction with one input terminal 111. The input terminal 111 comprises the functional blocks described above as shown in FIG. 4, and operates as described above. The system controller 2005 is located within the input terminal 111 or is coupled thereto by a cable.

Figure 21:
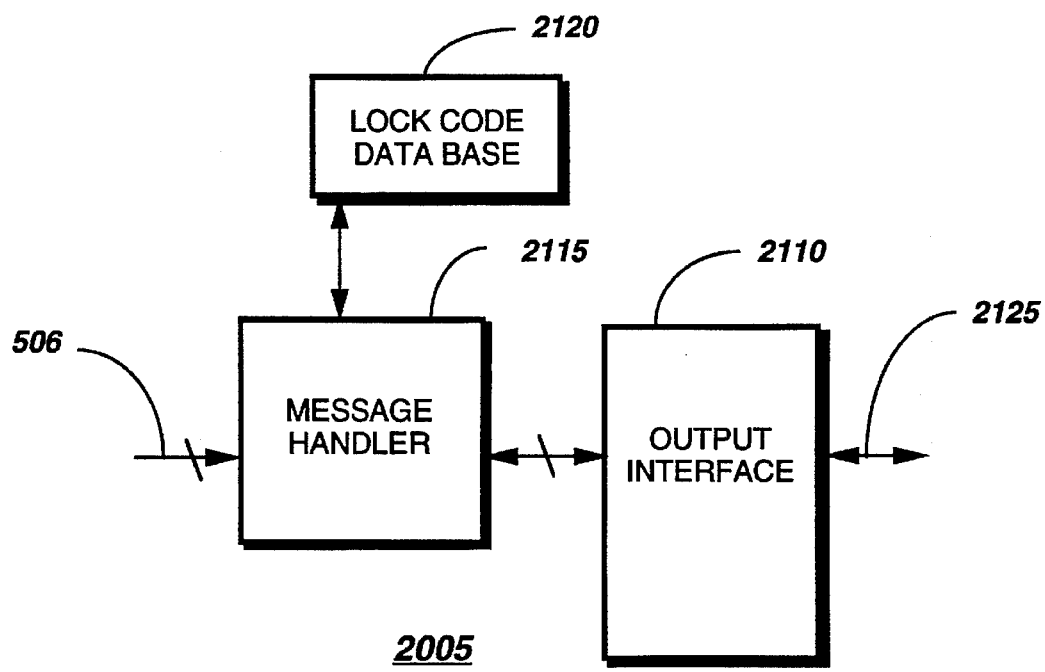
FIG. 21 is an electrical block diagram of a system controller used in the remote controlled lock system, in accordance with the second and third alternate embodiments of the present invention.

Referring to FIG. 21, an electrical block diagram of the system controller 2005 is shown in accordance with the second and third alternate embodiments of the present invention. The system controller 2005 comprises a message handler 2115, a lock code data base 2120, and an output interface 2110. The message handler 2115, which routes and processes messages, is coupled to the output 506 of the remote system interface 503 of the input terminal 111 and is further coupled to the output interface 2110 and the lock code data base 2120. The output interface 2110 in the second and third alternate embodiments of the preferred invention handles serial communication of the lock commands from the message handler 2115 to the remote lock devices 105 via a radiated signal, and provides proper voltages for driving the radiating device 2010. The lock code data base 2120 stores a correlation between a lock instruction and a lock code and a correlation between an unlock instruction and an unlock code for each of the remote lock devices 105.

When the system controller 2005 receives the lock command, the system controller 2005 uses the lock code data base 2120 to generate a lock or an unlock digital code corresponding to the lock or unlock instruction received in the lock command for each remote lock device 105 identified in the lock command. The lock and unlock codes can be different for each remote lock device 105. The system controller 2005 includes the lock or unlock digital code in a digital message which is transmitted to each of the remote lock devices 105 via the radiating device 2010 connected to the output interface 2110.

The output interface 2110 is preferably a communications card which is installed in an option slot of the input terminal 111, with the message handler 2115 being a unique program stored in the input terminal 111, and the lock code data base 2120 being data stored in the input terminal 111.

The output interface 2110 in the second alternate embodiment of the present invention comprises a low power radio frequency transmitter such as a garage door transmitter, well known to one of ordinary skill in the art, adapted for use with and mounted on the communication card. In the second alternate embodiment of the present invention, the radiating device 2010 is a radio frequency antenna, preferably mounted outside of the input terminal 111 and coupled thereto by a radio frequency cable. In the second alternate embodiment of the present invention, the intercepting device 601 of the receiver 310 is a radio antenna, and the receiver module is a radio frequency receiver of moderate receive sensitivity, such as a garage door receiver adapted for use in the remote lock device 105, well known to one of ordinary skill in the art.

In the third alternate embodiment of the present invention, the output interface 2110 is an infrared light transmitter such as a remote control device commonly used to control televisions and high fidelity equipment remotely, adapted for use with and mounted on the communication card. In the third alternate embodiment of the present invention, the radiating device is light emitting diode, preferably mounted on the communication card but extended out of the housing thereof, or mounted externally to the input terminal 111 and coupled thereto by a cable. In the third alternate embodiment of the present invention, the intercepting device 601 of the receiver 310 is a light sensitive diode, and the receiver module is an infrared receiving module such as a remote control receiver used in televisions and high fidelity equipment to receive infrared remote control signals, adapted for use in the remote lock device 105, well known to one of ordinary skill in the art.

It will be appreciated that any of the preferred and alternate embodiments of the remote lock system described may be more appropriate in different circumstances. The preferred embodiment of the remote lock system 100 can be implemented within an already existing wide area radio system, such as a paging system, eliminating the costs of installing the radio transmission part of the remote lock system. This implementation would be suitable, for example, for a wide area system covering a city or an in-building system covering a large building. The alternate embodiments are suitable, for example, for a single office system, using radio frequency, infrared, or cable connections to the remote lock devices. It will be further appreciated that the remote lock devices 105 can be locked or unlocked by the user when the user is away from the input terminal when the input terminal is equipped with a remote access system, such as Apple Remote Access, supplied by Apple Computer, Inc. of Cupertino, Calif.

By now it should be appreciated that there has been provided a remote lock system which allows all of a set of locks to be activated automatically, in response to an action which also unlocks or locks a mode of an input terminal, thereby eliminating the necessity to manually and individually unlock or lock the set of locks. This saves time and improves security. The security is improved because when the locks are locked, no locks are forgotten, and because the lock command can be given remotely when necessary (as when the user leaves the input terminal before the lock mode of the terminal occurs), using a unique digital lock and unlock code for each or all of the set of locks.

We claim:

1. A remote controlled lock system, comprising:
   a computer, comprising:
      a security utility for generating a change of a user access condition of the computer in response to one of a user password input and an event, and for generating a corresponding output signal which indicates the change of the user access condition, wherein the user access condition either allows or prevents user access to at least one program or file in the computer; and
      a command generator, coupled to said security utility, for generating at least one digital lock command in response to the output signal, wherein the at least one digital lock command includes one of a lock instruction and an unlock instruction;
   a paging system controller, coupled to said computer, for receiving the at least one digital lock command and generating at least one selective call receiver address corresponding to a selective call receiver identity and generating one of a digital lock code and a digital unlock code;
   a transmitter, coupled to said paging system controller, for transmitting a radio frequency signal including the at least one selective call receiver address and the one of the digital lock code and digital unlock code;
   at least one remote controlled lock device, comprising:
      a selective call receiver for receiving the radio frequency signal and for generating one of a lock signal and an unlock signal when the at least one selective call receiver address matches a predetermined address stored in the selective call receiver and the one of the digital lock code and the digital unlock code matches a predetermined respective lock code and unlock code stored in said selective call receiver; and
      an electromechanical lock having a locking member, wherein the locking member is switched to one of a mechanically stable lock position and a mechanically stable unlock position, respectively, in response to the one of the lock signal and unlock signal.

2. A remote controlled lock system for automatically controlling remote locks, comprising:
   a computer, comprising:
      a security utility for generating a change of a user access condition of the computer in response to one of a user password input and an event, and for generating a corresponding output signal which indicates the change of the user access condition, wherein the user access condition either allows or prevents user access to at least one program or file in the computer; and
      a command generator, coupled to said security utility, for generating at least one lock command in response to the output signal, wherein the at least one lock command includes one of a lock instruction and an unlock instruction;
   a system controller coupled to said computer for receiving the at least one lock command, and generating one of a lock code and an unlock code corresponding to the one of the lock instruction and the unlock instruction in the at least one lock command;
   a transmitter, coupled to said system controller, for transmitting a signal including the one of the lock code and the unlock code; and
   at least one remote controlled lock device, comprising:
      a receiver for receiving the signal and for generating one of a lock signal and an unlock signal when the one of the lock code and the unlock code matches one of two corresponding codes stored in said receiver; and
      an electromechanical lock having a locking member, wherein the locking member is switched to a mechanically stable position, which is one of a lock position and an unlock position, in response to the one of the lock signal and the unlock signal.

3. The remote controlled lock system according to claim 2, wherein the signal is an infrared signal.

4. The remote controlled lock system according to claim 2, wherein said system controller and transmitter are included within the computer, and wherein the lock code and the unlock code are digital codes.

5. The remote controlled lock system according to claim 2, wherein said system controller and transmitter are external to the computer and the at least one lock command is generated as a digital signal.

6. The remote controlled lock system according to claim 2, wherein the system controller is coupled to the at least one remote controlled lock device by a cable.

7. The remote controlled lock system according to claim 2, wherein the signal is a radio frequency signal.

8. The remote controlled lock system according to claim 2,
   wherein said receiver is a selective call receiver, and
   wherein the at least one lock command further includes at least one selective call receiver identity, and
   wherein said system controller generates at least one selective call receiver address corresponding to the at least one selective call receiver identity, and
   wherein said selective call receiver generates the one of the lock signal and the unlock signal when said selective call receiver address matches a predetermined address stored in said selective call receiver and the one of the lock code and the unlock code matches the one of the two corresponding codes stored in said selective call receiver.

9. The remote controlled lock system according to claim 8, wherein said system controller is a paging terminal.

10. In a remote controlled lock system, a method for automatically controlling locks, comprising the steps of:
   changing a user access condition of the computer in response to one of a user password input and an event, and generating a corresponding output signal which indicates the change of the user access condition, wherein the user access condition either allows or prevents user access to at least one program or file in the computer;
   generating at least one lock command automatically, including one of a lock instruction and an unlock instruction, in response to the output signal;
   transmitting a signal including one of a lock code and an unlock code corresponding to the one of the lock instruction and the unlock instruction, to the remote lock device;
   receiving the signal at the remote lock device; and
   activating, at the remote lock device, an electromechanical lock to set a locking member at one of a lock position and an unlock position corresponding to the one of the lock instruction and unlock instruction included in the signal.

* * * * *